US007290260B2

(12) United States Patent
Miller

(10) Patent No.: US 7,290,260 B2
(45) Date of Patent: Oct. 30, 2007

(54) DYNAMIC PROCESSOR REDISTRIBUTION BETWEEN PARTITIONS IN A COMPUTING SYSTEM

(75) Inventor: Micah William Miller, Bloomington, MN (US)

(73) Assignee: International Business Machines Corporation, Armonk, NY (US)

( * ) Notice: Subject to any disclaimer, the term of this patent is extended or adjusted under 35 U.S.C. 154(b) by 478 days.

(21) Appl. No.: 10/370,236

(22) Filed: Feb. 20, 2003

(65) Prior Publication Data

US 2004/0168170 A1 Aug. 26, 2004

(51) Int. Cl.
G06F 9/46 (2006.01)
G06F 15/173 (2006.01)
G06F 12/00 (2006.01)
G06F 13/00 (2006.01)
G06F 13/28 (2006.01)

(52) U.S. Cl. .................. 718/104; 718/105; 709/226; 711/147; 711/153

(58) Field of Classification Search ........ 718/104–105; 709/226; 711/147, 153
See application file for complete search history.

(56) References Cited

U.S. PATENT DOCUMENTS

| | | | |
|---|---|---|---|
| 5,345,590 A | | 9/1994 | Ault et al. |
| 6,332,180 B1 * | | 12/2001 | Kauffman et al. ......... 711/153 |
| 6,381,682 B2 * | | 4/2002 | Noel et al. ................ 711/153 |
| 6,587,938 B1 * | | 7/2003 | Eilert et al. ............... 712/29 |
| 6,633,916 B2 | | 10/2003 | Kauffman |
| 6,711,649 B1 * | | 3/2004 | Bachmat et al. ........... 711/114 |
| 6,795,797 B2 * | | 9/2004 | Lee et al. .................. 702/186 |
| 6,986,137 B1 * | | 1/2006 | King et al. ................ 718/104 |
| 7,007,276 B1 * | | 2/2006 | Kubala et al. ............. 718/104 |
| 2002/0087611 A1 * | | 7/2002 | Tanaka et al. .............. 709/1 |
| 2003/0158940 A1 * | | 8/2003 | Leigh ....................... 709/226 |
| 2005/0268154 A1 | | 12/2005 | Wipfel et al. |

FOREIGN PATENT DOCUMENTS

| | | |
|---|---|---|
| JP | 09-091257 | 4/1997 |
| JP | 09-212467 | 8/1997 |
| JP | 10-293695 | 11/1998 |
| JP | 11-259316 | 9/1999 |
| JP | 2000-357102 | 12/2000 |
| JP | 2001-331333 | 11/2001 |
| JP | 2002-202959 | 7/2002 |
| JP | 2003-157177 | 5/2003 |
| WO | WO 01023974 | 4/2001 |

OTHER PUBLICATIONS

K. Dussa et al., "Dynamic Partitioning in a Transputer Environment," Apr. 1990, ACM, pp. 203-213.*

* cited by examiner

Primary Examiner—William Thomson
Assistant Examiner—Qing-Yuan Wu
(74) Attorney, Agent, or Firm—James R. Nock

(57) ABSTRACT

A method, apparatus and program product for the dynamic reallocation of shared processing resources in a computing system is provided. The method/apparatus/program product attempts to allocate the shared processing resource among the two or more logical partitions in the computing system based on a current utilization of the shared processing resource among each of the two or more logical partitions and a current utilization of shared processing resource for the computing system as a whole. More specifically, the shared processing resource is reallocated from logical partitions having a relatively lower current utilization of their owned portion of the shared processing resource to logical partitions having a relatively high current utilization of their owned portion of the shared processing resource.

14 Claims, 4 Drawing Sheets

LOGICAL PARTITIONS BEFORE REALLOCATION

| PARTITION #1 | PARTITION #2 | PARTITION #3 | PARTITION #4 | PARTITION #5 |
| --- | --- | --- | --- | --- |
| 5 PROC. | 4 PROC. | 4 PROC. | 2 PROC. | 1 PROC. |
| 20% UTIL. | 50% UTIL. | 10% UTIL. | 80% UTIL. | 70% UTIL. |

LOGICAL PARTITIONS AFTER REALLOCATION

| PARTITION #1 | PARTITION #2 | PARTITION #3 | PARTITION #4 | PARTITION #5 |
| --- | --- | --- | --- | --- |
| 2.81 PROC. | 5.61 PROC. | 1.12 PROC. | 4.49 PROC. | 1.97 PROC. |
| 35.6% UTIL. | 35.6% UTIL. | 35.6% UTIL. | 35.6% UTIL. | 35.6% UTIL. |

LOGICAL PARTITIONS BEFORE REALLOCATION

PARTITION #1  PARTITION #2  PARTITION #3  PARTITION #4  PARTITION #5
5 PROC.          4 PROC.          4 PROC.          2 PROC.          1 PROC.
50% UTIL.        30% UTIL.        70% UTIL.        90% UTIL.        10% UTIL.

LOGICAL PARTITIONS AFTER REALLOCATION

PARTITION #1  PARTITION #2  PARTITION #3  PARTITION #4  PARTITION #5
5 PROC.          2.28 PROC.       5.11 PROC.       3.42 PROC.       .19 PROC.
50% UTIL.        52.5% UTIL.      55% UTIL.        52.5% UTIL.      52.5% UTIL.

DYNAMIC PROCESSOR REDISTRIBUTION BETWEEN PARTITIONS IN A COMPUTING SYSTEM

CROSS-REFERENCE TO RELATED APPLICATIONS

The present application is related to U.S. patent application Ser. No. 10/360,251, filed Feb. 6, 2003 and titled "Method and Apparatus for Dynamically Allocating Resources of a Dead Logical Partition", which is hereby incorporated by reference herein in its entirety.

FIELD OF THE INVENTION

The present invention relates generally to logical partitions within a computing system, and more specifically to redistributing shared processing resource among logical partitions in a computing system based on processor utilization.

BACKGROUND OF THE INVENTION

Logical partitioning (LPAR) is a mode of machine operation where multiple copies of operating systems run within a single computer system. A logical partition is a collection of machine resources that are capable of running an operating system. The resources include processors (and associated caches), main storage, and I/O devices. Partitions operate independently and are logically isolated from other partitions. In other words, each logical partition is capable of operating as if it were a separate computer system. Each logical partition can be independently reset, initially loaded with an operating system that may be different for each logical partition, and operated with different software programs using different input/output (I/O) devices. In this environment, install, initial program load (IPL), power down, and partition failures all occur without impacting other partitions on the system.

IBM Corporation began the study of logical partitioning for the S/370 architecture in 1976. The project proved that logical partitioning was a workable concept. In 1988, LPAR was first implemented on IBM's S/390 systems and has been available on IBM mainframes for more than a decade. Examples of logically partitioned computing systems are described in, for instance, U.S. Pat. No. 4,564,903, issued on Jan. 14, 1986, U.S. Pat. No. 4,843,541, issued Jun. 27, 1980, and U.S. Pat. No. 5,564,040, issued on Oct. 8, 1996.

Over that period, LPAR evolved from a predominantly physical partitioning scheme, based on hardware boundaries, to one that allows for virtual and shared resources, with load balancing capabilities. Today, all major computer manufacturers offer some form of partitioning.

The factors that have driven the evolution of mainframe partitioning over the past decade are now at work in the server system arena. Partitioning is fast becoming a necessity there also. It was estimated that during 2001, all of the major players in the server marketplace offered some degree of partitioning.

As an example, IBM's iSeries servers, and their AS/400 predecessors have offered LPAR technology since 1999 via OS/400. Logical partitioning implementation on iSeries and AS/400 servers is an adaptation of the S/390 logical partitions concept, with flexible and granular allocation of system resources. It also offers flexibility in allocating interactive performance along with high-speed internal communications between partitions.

Logical partitioning offers several advantageous features. For example, logical system partitions reduce the number of physical systems that must be managed. The benefits include easier administration through a single system console and flexibility to shift resources from one partition to another. This is a benefit as applications grow, or when demand reaches peak levels requiring additional resources. Also, workloads that cannot fully use a large system (because of contention, for example), may perform better when the workload is run as multiple images using partitions.

A partitioned system can be shared by multiple projects or departments, simplifying cost justification and cost accounting requirements. Additionally, some workloads that may not run well together on a single machine can be isolated from each other through the use of partitions. For example, there could be a general purpose interactive and batch workload composed of payroll, forecasting and planning, while another workload handles inventory control. Logical partitioning also provides an effective solution for using systems dedicated as an Internet firewall.

Also, in a scenario where some partitions on one system are backed up by partitions on a different system, logical partitioning can make fail-over situations less strenuous. A fail-over occurs when the main system encounters a problem and a backup system takes control in place of the main system. In the case of a software failure confined to a partition, only the workload of that partition shifts over to the backup partition on the second physical system. In a non-partitioned scenario, the entire system will have to fail-over.

Logical partitioning also enables customers having separate production and test environments to continue their test and developmental work without negatively impacting production work. Finally, logical partitions may be used to move an operating system or application software to updated versions. The new software can be tested in isolation before being deployed in a production environment.

One important aspect of a logically partitioned system is the management of workload running within the partitions of that system. In S/390 systems, for example, workload managers are used to manage the workload within and among the partitions. In the AS/400 and i-Series platforms, this function is performed by the hypervisor. The workload manager/hypervisor attempts to balance the workload of the partitions by moving work to the physical resources of the system.

U.S. Pat. No. 6,986,137, entitled "Method, System and Program Products for Managing Logical Processors of A Computing Environment, filed Sep. 28, 1999, provides dynamic management and adjustment of the logical processors among logical partitions in a computing environment. This dynamic adjustment is in response to the workload of the logical partition. In U.S. Pat. No. 6,986,137, the determination of whether a logical partition's resources will be adjusted is made by comparing the result of a predefined equation for the partition against one or more predefined thresholds. This resource adjustment only considers a partition's own processor utilization when determining the amount of processing units it should receive.

It is desirable to enhance the dynamic adjustment of processor resource among a plurality of logical partitions within a computing system by not only taking into consideration the processor utilization of a single partition in isolation to the rest of the partitions within the computing system, but the processor utilization of all partitions within the computing system. In this way the overall system condition of the computing system is considered so that resources assigned to one partition can be re-allocated to another partition that needs them more.

SUMMARY OF THE INVENTION

The present invention provides an apparatus, method and program product which dynamically redistributes processing resources between logical partitions in a computing environment based on processor utilization within the logical partitions.

In one embodiment, the present invention provides an apparatus having at least one processor and a memory coupled to the at least one processor. The apparatus further includes two or more logical partitions, where each of the logical partitions owns a portion of the shared processing resource. A dynamic processor allocation mechanism also resides within the apparatus, which allocates the shared processing resource among the partitions based on the current utilization of the shared processing resource among the partitions, and the utilization of the shared processing resource for the apparatus as a whole. More specifically, the dynamic processor allocation mechanism executes a function which determines the current utilization of the shared processing resource for each partition and the apparatus as a whole. The function next compares the current utilization of the shared processing resource for each partition and the apparatus as a whole, then reallocates the shared processing resource from logical partitions having a relatively lower processing resource utilization to partitions having a relatively higher processing resource utilization. In one embodiment, the execution of the function occurs on a periodic, predetermined time interval. In an alternate embodiment, the time interval between successive executions of the function is dynamically adjusted.

In another embodiment, the present invention provides a computer-implemented method for managing a shared processing resource in a computer system, wherein the computer system includes two or more logical partitions that each own portions of the shared processing resource. The method begins by determining a current utilization of the shared processing resource for each of the two or more logical partitions and a current utilization of the shared processing resource for the system as a whole. Next the method compares the current utilization of the shared processing resource for each of the two or more logical partitions and the current utilization of the shared processing resource for the computer system as a whole. Finally, the method reallocates the shared processing resource from logical partitions having a relatively lower current utilization of their owned portion of the shared processing resource to logical partitions having a relatively higher current utilization of their owned portion of the shared processing resource.

In yet another embodiment, the present invention provides a program product which includes a dynamic processor allocation mechanism which attempts to allocate a shared processing resource among two or more logical partitions in a computer system. This allocation is based on a current utilization of the shared processing resource among each of the two or more logical partitions and the current utilization of shared processing resource for the computer system as a whole. The program product further includes a computer readable signal bearing media bearing the dynamic resource allocation mechanism.

The foregoing and other features and advantages of the invention will be apparent from the following more particular description of the preferred embodiments of the invention, as illustrated in the accompanying drawings.

DETAILED DESCRIPTION OF THE PREFERRED EMBODIMENTS

According to preferred embodiments of the present invention, the present invention improves performance of a computer system having multiple partitions by dynamically readjusting the shared processing resource of the computer system. This dynamic readjustment tunes the system by donating resources from logical partitions having a relatively lower shared resource utilization of the resource they currently own, to partitions that have a relatively higher shared resource utilization of the resource they currently own.

Figure 1:
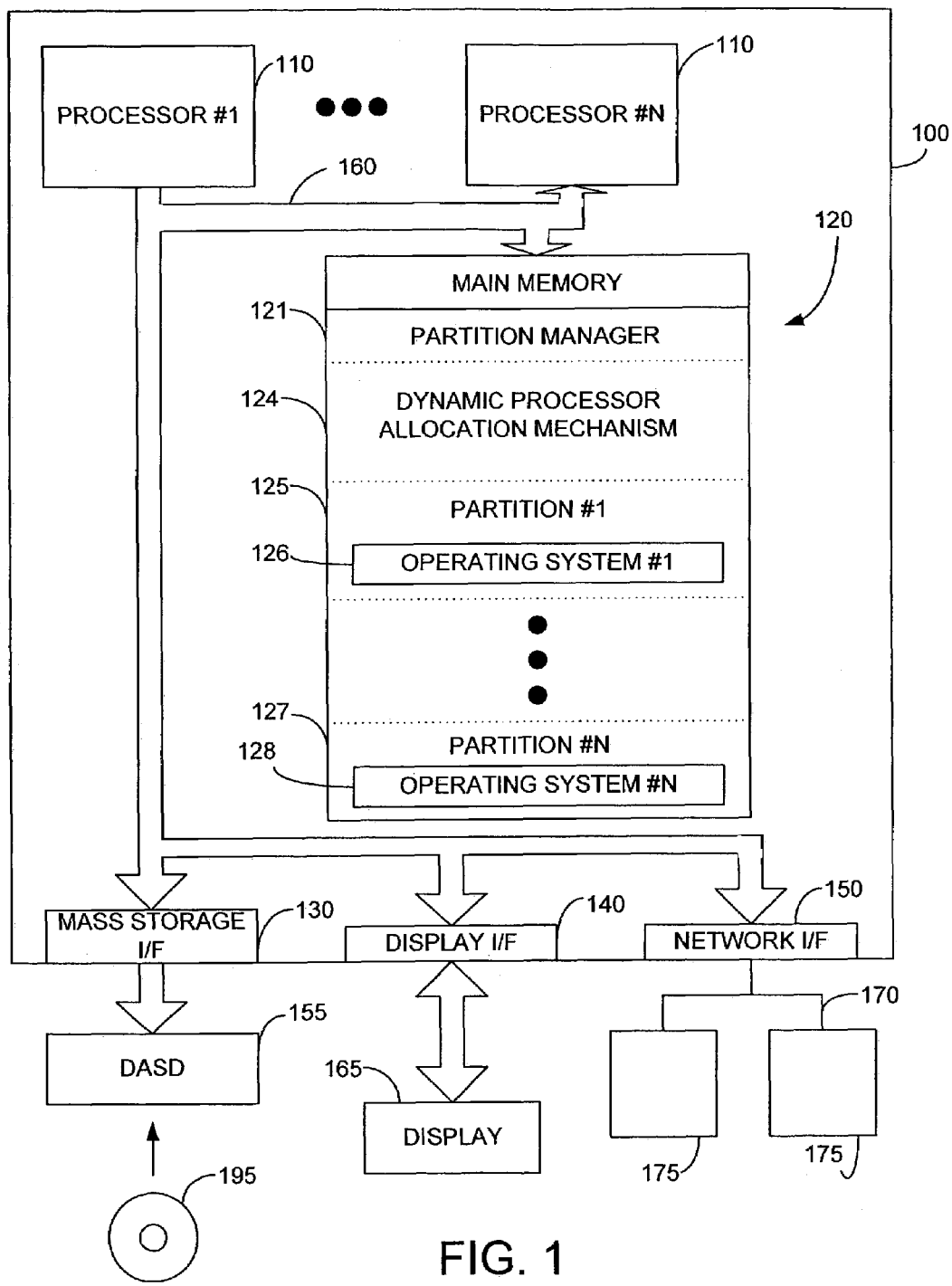
FIG. 1 is a block diagram of a computer apparatus that supports logical partitioning and dynamic resource allocation in accordance with the preferred embodiments.

Referring to FIG. 1, a computer system 100 is an enhanced IBM iSeries computer system, and represents one suitable type of computer system that supports logical partitioning and dynamic resource allocation in accordance with the preferred embodiments. Those skilled in the art will appreciate that the mechanisms and apparatus of the present invention apply equally to any computer system that supports logical partitions.

As shown in FIG. 1, computer system 100 comprises one or more processors 110 connected to a main memory 120, a mass storage interface 130, a display interface 140, and a network interface 150. These system components are interconnected through the use of a system bus 160. Mass storage interface 130 is used to connect mass storage devices (such as a direct access storage device (DASD) 155) to computer system 100. Once specific type of direct access storage device is a CD RW drive, which may read data from a CD RW disk 195.

Main memory 120 contains a partition manager 121, a dynamic processor allocation mechanism 124, and at least two logical partitions, 125 and 127. Partition manager 121 preferably creates a single primary partition 125, and one or more secondary partitions 127, all of which are logical partitions. The primary partition preferably includes an operating system 126, and each of the secondary partitions 127 also preferably includes an operating system 128.

Operating system 126 is a multitasking operating system known in the industry as OS/400; however, those skilled in the art will appreciate that the spirit and scope of the present invention is not limited to any one operating system. Any suitable operating system can be used. Operating system 126 is a sophisticated program that contains low-level code to manage the resources of computer system 100. Some of these resources are processors 110, main memory 120, mass storage interface 130, display interface 140, network interface 150, and system bus 160. The operating system 128 in each secondary partition 127 may be the same as the operating system 126 in the primary partition 125, or may be a completely different operating system. Thus, primary partition 125 can run the OS/400 operating system, while secondary partition(s) 127 can run another instance of OS/400, possibly a different release, or with different environment settings (e.g., time zone). The operating system(s) in the secondary partition(s) 127 could even be different than OS/400, provided it is compatible with the hardware. In this manner, the logical partitions can provide completely different computing environments on the same physical computer system.

Dynamic processor allocation mechanism 124 is used to reallocate portions of a shared processing resource (e.g., one or more processors 110) from underutilized logical partitions (i.e., those partitions having a relatively lower current utilization of their owned portion of the shared processing resource) to overutilized partitions (i.e., those partitions having a relatively higher current utilization of their owned portion of the shared processing resource).

The partitions 125 and 127 are shown in FIG. 1 to reside within main memory 120. However, one skilled in the art will recognize that a partition is a logical construct that includes resources other than memory. A logical partition typically specifies a portion of memory, along with an assignment of processor capacity and other system resources. Thus, primary partition 125 could initially be defined to include one or more processors 110 and a portion of memory 120, along with one or more I/O processors that can provide the functions of mass storage interface 130, display interface 140, network interface 150, or interfaces to other I/O devices. Secondary partition(s) 127 could then be defined to each initially include a processor allocation, a different portion of memory 120, and one or more I/O processors. The partitions are shown in FIG. 1 to symbolically represent logical partitions, which would include system resources outside of memory 120 within computer system 100. Note also that dynamic processor allocation mechanism 124 preferably resides in the primary partition 125, but could reside in any of the defined partitions in the computer system 100, or even on a computer system 175 coupled to computer system 100 via network 170.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while partition manager 121 and the partitions 125 and 127 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up the partition manager 121, which initializes the operating systems in the logical partitions.

Although computer system 100 is shown to contain only a single system bus 160, those skilled in the art will appreciate that the present invention may be practiced using a computer system that has multiple buses. In addition, the interfaces (called input/output processors in AS/400 terminology) that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer readable signal bearing media used to actually carry out the distribution. Examples of suitable signal bearing media include: recordable type media such as floppy drives and CD RW (e.g., 195 of FIG. 1), and transmission type media such as digital and analog communications links.

Figure 2:
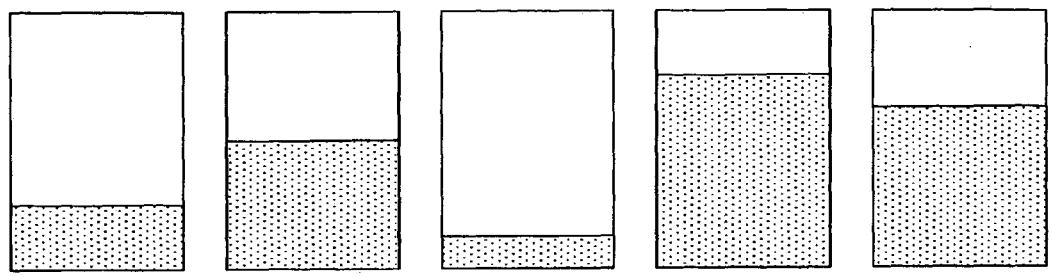
FIG. 2 is a block diagram of a first example of a computer apparatus having multiple partitions, wherein a dynamic processor reallocation mechanism reallocates shared processing resources between the partitions based on current utilization.
Figure 2:
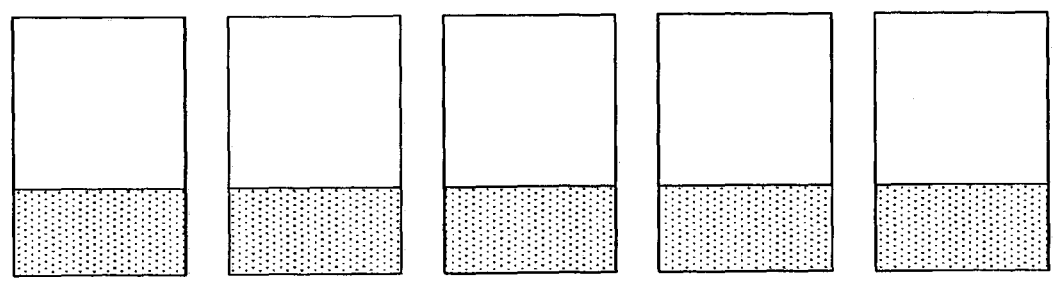

FIG. 2 illustrates a first example of a computer apparatus having multiple partitions, wherein a dynamic processor reallocation mechanism reallocates shared processing resource between the partitions based on current utilization. In the illustrated embodiment it is assumed that all available CPU units are assigned to partitions, thus the total number of CPU units in a given cluster of nodes will remain constant.

As shown in the illustrated embodiment, the computer system has five logical partitions (Partitions #1-#5), the partitions having an initial allocation of 5 processors, 4 processors, 4 processors, 2 processor and 1 processor, respectively. In this example, all processors collectively form a shared processing resource that can be redistributed across all partitions within the computer system. Such redistribution is subject to some constraints. In the illustrated example, shared processing resource may be allocated in increments of 0.01 processing unit. However, each partition is required to have a base processing resource which may not be reallocated. For example, in the illustrated embodiment, partition #1 requires a minimum of 1.00 processor units, while partitions 2-5 require a minimum of 0.1 processor units. Also, the computer system may impose limitations on the maximum amount of processing resource units a partition can have. For the purpose of this example, it is assumed that the maximum number of processor units a partition may have is 10. Further, the reallocation itself does require some processing resource, so reallocation occurs only where the current processor utilization of a particular partition is greater than or less than some predefined variance from the system average utilization. This ensures that the redistribution occurs only when a partition is significantly overutilized or underutilized with respect to the system average. In the illustrated example, the minimum required variance is 5% (0.05). This means that if the processor utilization for the overall computer system is 35% or (0.35), only those partitions that have a utilization less than 30% (0.30) or a utilization greater than 40% (0.40) will be considered candidates for reallocation.

In the present invention, each partition within the computer system is polled for its current processor utilization. Processor utilization is calculated for each partition individually, and also for the computer system as a whole. After a predefined number of passes where processor utilization is collected from the nodes and the averages of all passes are calculated, an auction is performed in order to decide how shared processing resource (i.e., processor units) will be redistributed.

FIG. 2 illustrates such an auction. In the illustrated example, partitions #1-#5 have processor utilizations of 20%, 50%, 10%, 80% and 70%, respectively. The first step in the auction is to calculate the processor utilization for the system as a whole. This is done by multiplying the number of processors in a given partition by the processor utilization for each partition, adding the results together for all partitions, and dividing the summed product by the total number of processors in the computer system. In the illustrated example, the calculation is as follows:

$$(((5*0.2)+(4*0.5)+(4*0.1)+(2*0.8)+(1*0.7))/16)$$
$$=0.356 \text{ or } 35.6\% \text{ utilization}$$

Next, the method constructs a bid for each partition considered as a processing resource recipient. In the illustrated example, partitions 2, 4 and 5 are considered recipient candidates, since their current processor utilizations exceed the average processor utilization for the system as a whole (i.e., their existing processors are relatively overutilized). The bid for each partition is determined by dividing the processor utilization for the partition by the processor utilization for the computer system as a whole. Thus, in this example:

Partition #2 bid=0.5/0.356=1.40

Partition #4 bid=0.8/0.356=2.25

Partition #5 bid=0.7/0.356=1.97

A partition is considered to be a recipient candidate for processing resource if its bid is greater than 1. Processing units are assigned to each requesting partition based on the magnitude of the bid. Requesting partitions are assigned processing resource from donating units based on the relative magnitude and ordering of the bids. For example, partition #4 has the highest numerical bid (its processing resource has the highest relative utilization), so it will be the first of the partitions in line to receive processing resource donated by underutilized partitions.

In order to balance processing load in a relatively equal manner across all partitions, partition #2 ideally wants to be at (0.5/0.356)*4=5.61 units. This number is arrived at by multiplying the bid by number of processing units currently assigned to the partition. Since Partition #2 is already at 4 units, it is requesting 5.61−4=1.61 processor units. Likewise, partition #4 ideally wants to be at (0.8/0.356)*4=4.49 units. Since partition #4 is already at 2 units, partition #4 is requesting a 4.49−2=2.49 additional processor units. Finally, partition #5 ideally wants to be at (0.7/0.356)*1=1.97 units.

Since partition #5 is already at 1 unit, partition #5 is requesting an additional 0.97 processor units. In this example, partitions #2, #4 and #5 are all eligible to receive additional processing units because their current processor utilizations (0.5, 0.8 and 0.7, respectively) are greater than the average utilization (0.356) plus the variance (0.05). Also, none of the processors will exceed the maximum processor/ partition allocation of 10 processing units after the reallocation.

Now the method determines which partitions are eligible as processing resource donators, and how much resource each partition is eligible to donate. In this example, partitions #1 and #3 are potential processing resource donating candidates, since their processing resource utilization is less (20% and 10%, respectively) than the average processor utilization resource for the system as a whole (35.6%). Further, partitions #1 and #3 are eligible donators since their current processor utilizations (0.2, and 0.1 respectively) are less than the average utilization (0.356) minus the variance (0.05).

Once again, the bid for each partition is determined by dividing the processor utilization for the partition by the processor utilization for the computer system as a whole. Thus, in this example:

Partition #1 bid=0.2/0.356=0.56

Partition #3 bid=0.1/0.356=0.28

A partition is considered to be a candidate for processing resource donation if its bid is less than 1. In the case of donating partitions, the partition with the lowest bid will be the first partition to donate resource.

In order to balance processing load equally across all partitions, partition #1 will be eligible to donate (1−(0.2/ 0.356))*5=2.19 processing units. This calculation is arrived at by subtracting the bid from 1, then multiplying the result by the number of processing units currently assigned to the partition. Likewise, partition #3 will be able to donate (1−(0.1/0.356))*4=2.88 units. In this instance, both partition candidates meet the minimum requirements of at least 1 processing unit for the primary partition (partition #1) and 0.1 processing unit for secondary partitions (partition #3) after the redistribution. The following table indicates the approximate amount of resource eligible for redistribution, and the order of such distribution at this point:

TABLE 1

PROCESSOR REDISTRIBUTIONS

| Donating Partition/Amount | | Receiving Partition/Amount | |
|---|---|---|---|
| Partition #3 | 2.88 units | Partition #4 | 2.49 units |
| Partition #1 | 2.19 units | Partition #5 | 0.97 units |
| | | Partition #2 | 1.61 units |
| Total | 5.07 units | Total | 5.07 units |

Immediately after the redistribution, the processor utilization across all partitions should be approximately the same (roughly 35.6%), as shown in the bottom half of FIG. 2. As time progresses, and workloads change within the partitions, the resource will once again need to be redistributed. In one embodiment of the present invention, this redistribution occurs on a regular time interval. Thus, for example, the redistribution may occur every 10 minutes. Alternately, the frequency of the redistribution function may be adjusted dynamically. For example, if after the current redistribution, it is determined that no adjustment is needed, the time interval between redistributions can be lengthened (multiplied by some constant factor or incremented by some time interval). If, on the other hand, the redistribution determines an adjustment is needed, the time interval between distributions can be shortened (divided by the same constant factor or decremented by a time interval). Since the function of determining processor utilization and reallocating resource has computational cost, the dynamic approach reduces the number of times these costs are encountered when no action needs to be taken. In this example, all partitions were active participants in the redistribution of shared processing resource. In the following example (FIG. 3) not all processing resource is available for donating/receiving.

Figure 3:
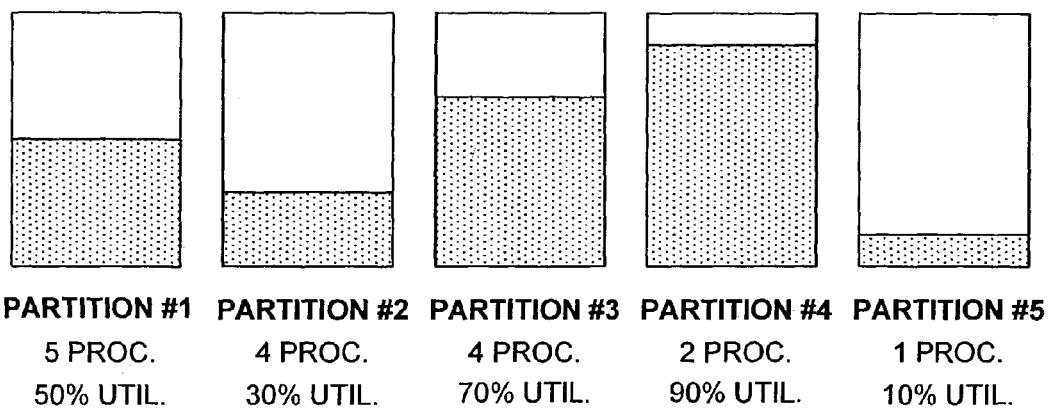
FIG. 3 is a block diagram of a second example of a computer apparatus having multiple partitions, wherein a dynamic processor reallocation mechanism reallocates shared processing resources between the partitions based on current utilization.
Figure 3:
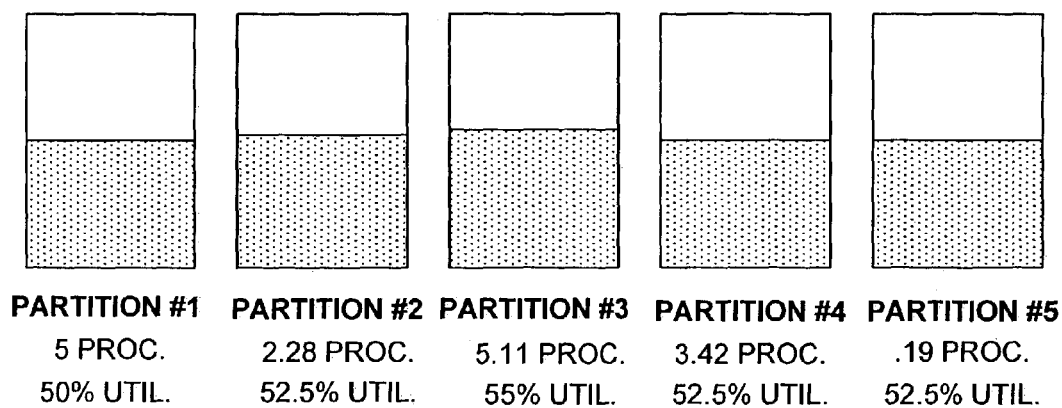

FIG. 3 illustrates a second example of a computer apparatus having multiple partitions, wherein a dynamic processor reallocation mechanism reallocates shared processing resources between the partitions based on current utilization. Once again, in the illustrated embodiment, it is assumed that all available CPU units are assigned to partitions, thus the total number of CPU units in a given cluster of nodes will remain constant.

As shown in the illustrated embodiment, the computer system has five logical partitions (Partitions #1-#5), the partitions having an initial allocation of 5 processors, 4 processors, 4 processors, 2 processor and 1 processor, respectively. In this example, all processors collectively form a shared processing resource that can be redistributed across all partitions within the computer system. Once again, such redistribution is subject to some constraints. Processing units, in this example, may be reassigned in 0.01 processing unit increments. Further, each partition is required to have a base processing resource which may not be reallocated. For example, in the illustrated embodiment, partition #1 requires a minimum of 1.00 processor units, while partitions 2-5 require a minimum of 0.1 processor units. Also, the computer system may impose limitations on the maximum amount of CPU units a partition can have. For the purpose of this example, it is assumed that the maximum number of processor units a partition may have is 10 processing units. In the illustrated example, the minimum required variance is 5% (0.05).

In the illustrated example, partitions #1-#5 have processor utilizations of 50%, 30%, 70%, 90% and 10%, respectively. The first step in the auction is to calculate the processor utilization for the system as a whole. In the illustrated example, the calculation is as follows:

$$(((5*0.5)+(4*0.3)+(4*0.7)+(2*0.9)+1*0.1))/16)$$
$$=0.525 \text{ or } 52.5\% \text{ utilization}$$

Next, the method constructs a bid for each partition considered as a processing resource recipient. In the illustrated example, partitions 3 and 4 are considered recipient candidates, since their current processor utilizations (0.7 and 0.9 respectively) exceed the average processor utilization for the system as a whole (0.525). The bid for each partition is determined by dividing the processor utilization for the partition by the processor utilization for the computer system as a whole. Thus, in this example:

Partition #3 bid=0.7/0.525=1.33

Partition #4 bid=0.9/0.525=1.71

Processing units are assigned to each requesting partition based on the bid. Requesting partitions are assigned processing resource from donating units based on the order of the bids. For example, partition #4 has the highest relative bid (its processing resource has the highest relative utilization), so it will be the first of the partitions in line to receive processing resource donated by underutilized partitions.

In order to balance processing load more equally across all partitions, partition #4 ideally wants to be at (0.9/0.525)*2=3.42 units. Since Partition #4 is already at 2 units, it is requesting 3.42−2=1.42 processor units. Likewise, partition #3 ideally wants to be at (0.7/0.525)*4=5.32 units. Since partition #3 is already at 4 units, partition #3 is requesting 5.32−4=1.32 additional processor units. In this example, partitions #3 and #4 are both eligible to receive additional processing units because their current processor utilizations (0.7 and 0.9, respectively) are greater than the average utilization (0.356) plus the variance (0.05). Also, none of the processors will exceed the maximum processor/partition allocation of 10 processing units after the reallocation.

Now the method determines which partitions are eligible as processing resource donators, and how much resource each partition is eligible to donate. In this example, partitions #1, #2 and #5 are potential processing resource donating candidates, since their processing resource utilization is less (50%, 30% and 10%, respectively) than the average processor utilization resource for the system as a whole (52.5%). However, only partitions #2 and #5 are eligible donators since their current processor utilizations (0.3, and 0.1 respectively) are less than the average utilization (0.525) minus the variance (0.05). Partition #1 does not qualify as a processing resource donator in this instance since its utilization (0.5) is not less than the average utilization for the computer system (0.525) as a whole minus the variance (0.05).

Once again, the bid for each partition is determined by dividing the processor utilization for the partition by the processor utilization for the computer system as a whole. Thus, in this example:

Partition #2 bid=0.3/0.525=0.57

Partition #5 bid=0.1/0.525=0.19

In the case of donating partitions, the partition with the lowest bid will be the first partition to donate resource. Thus, in this example, Partition #5 will be the first partition to donate its resource, since it has the lowest calculated bid.

In order to balance processing load more equally across all partitions, partition #5 will be eligible to donate (1−(0.1/0.525))*1=0.81 processing units. This will leave partition with 0.19 units after the redistribution, which still exceeds the minimum resource requirements for the partition (0.1). Likewise, partition #2 will be able to donate (1−(0.3/0.525))*1=1.72 units. Partition #2 will still have 2.28 processing units remaining after the reallocation, easily exceeding the 0.1 processor minimum processing unit requirement per secondary partition. The following table indicates the approximate amount of resource eligible for redistribution, and the order of such distribution at this point:

TABLE 2

PROCESSOR REDISTRIBUTIONS

| Donating Partition/Amount | | Receiving Partition/Amount | |
|---|---|---|---|
| Partition #5 | 0.81 units | Partition #4 | 1.42 units |
| Partition #2 | 1.72 units | Partition #3 | 1.32 units |
| Total | 2.53 units | Total | 2.74 units |

Unlike in the previous example, the resources from the donating partitions do not equal the resources for the receiving partitions. Thus, in this instance, the resources can only be partially redistributed. First, the 0.81 units available for donation from partition #5 are donated to partition #4, since these partitions have the highest and lowest bids, respectively. Next, 0.61 processing resource units are distributed from partition #2 to partition #4, leaving 1.11 processing units in partition #2 available for redistribution. The remaining 1.11 processing units in partition #2 are then distributed to partition #3, which had requested a total of 1.32 units. Thus, the request of partition #3 can only be partially fulfilled in this instance. As a result, the processor utilization across all partitions after the redistribution is only roughly equivalent, as shown in the lower half of FIG. 3. Note that partition #1 remains at roughly 50% after reallocation, since it did not participate in the reallocation. Likewise, the utilization of partition #3 remains slightly above average after the reallocation, since partition #3 was unable to obtain all of the resource it had requested.

Figure 4:
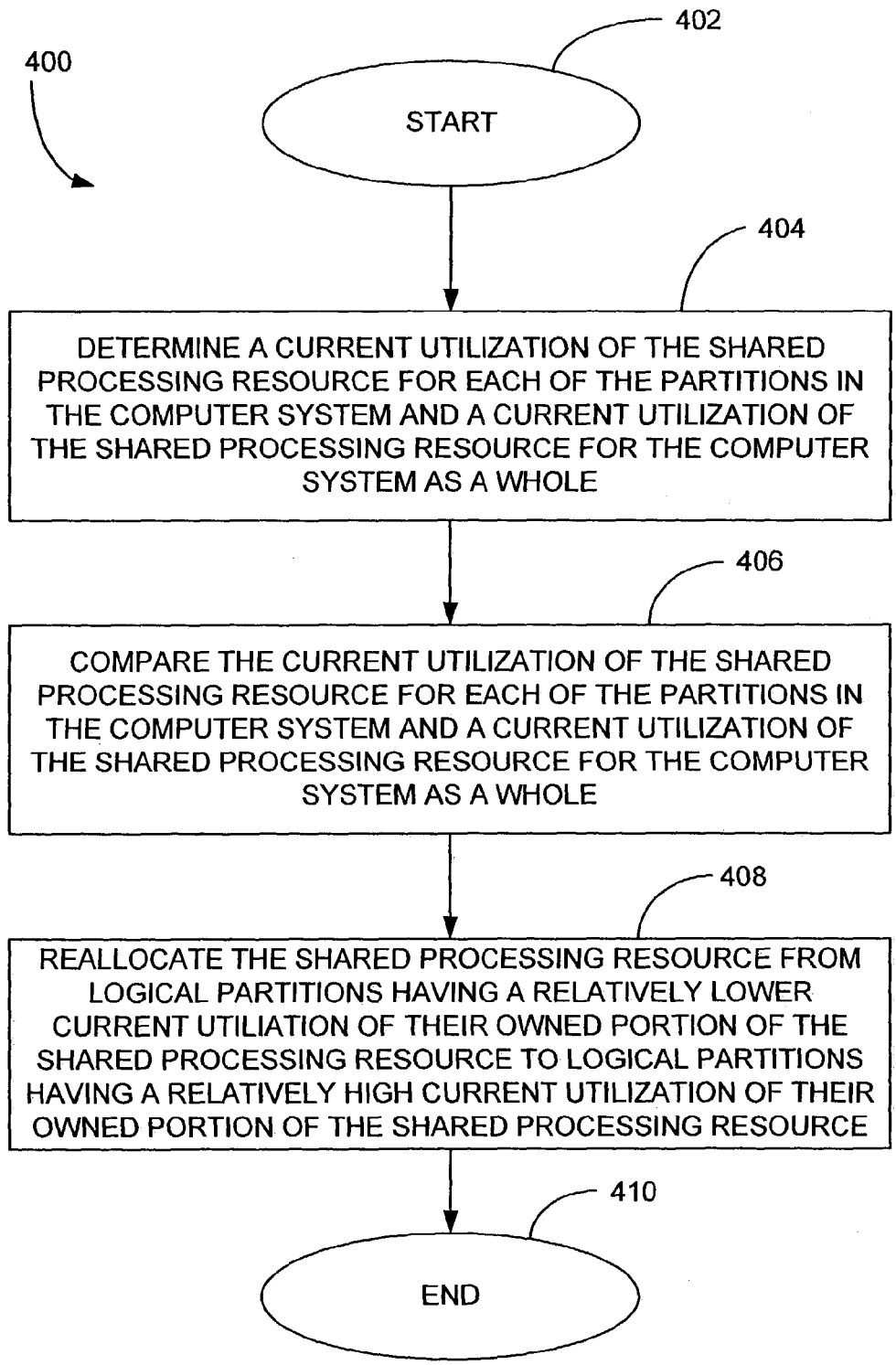
FIG. 4 is a flow diagram of a method in accordance with the preferred embodiments for dynamically redistributing shared processing resources.

FIG. 4 is a flow diagram of a method in accordance with the preferred embodiments for dynamically redistributing shared processing resources. The method begins by determining a current utilization of the shared processing resource for each of the partitions in the computer system and a current utilization of the shared processing resource for the system as a whole. This step includes the substeps of periodically polling each partition within the computer system for its current processor utilization for a predefined number of passes. After the predefined number of passes is reached, an average processor utilization is calculated for each partition and the computer system as a whole.

Next, the current utilization of the shared processing resource for each logical partition, and the current utilization of the shared processing resource for the computer system as a whole, are compared. More specifically, the current utilization of each partition is compared against the current utilization of the other partitions in the system in order to determine which partitions are under/over utilized. The current utilization of each partition is also compared against the current utilization for the entire computer system in order to determine which shared processing resources are available for redistribution.

Finally, the method reallocates the shared processing resource from logical partitions having a relatively lower current utilization of their owned portion of the shared processing resource to logical partitions having a relatively high current utilization of their owned portion of the shared processing resource. In order to accomplish this, a shared processing resource auction is held, where each partition has a "bid", which is calculated by dividing the partition's current utilization by the current utilization of the computer system as a whole. The partitions having a bid greater than one are considered candidates for receiving more of the shared processing resource. Similarly, partitions having a bid less than one are considered candidates for donating some of their processing resource. Donating/Receiving partitions are ordered by their bids, such that receiving partitions having the highest bid will receive first priority for reallocation, and donating partitions having the smallest bid will have their resources allocated first.

The illustrated embodiments of FIGS. 2 and 3 assume all partitions are initially considered candidates for processing resource reallocation. However, the present invention also contemplates that a user might wish to restrict the reallocation of processing resource between only a subset of the partitions within the computer system. Thus, the present invention allows the user to create "groups" of partitions which are eligible for processing resource reallocation. The capability allows certain important partitions within the computer system (i.e., those partitions not part of the defined reallocation group) to retain their processing units regardless of other partition's utilization. As an example, partitions running interactive processes might want to be excluded from the group of partitions eligible for reallocation.

As an example, if a computer system has five logical partitions (e.g., #1, #2, #3, #4, and #5), and it is desired that the processing resource of partition #1 remain dedicated (i.e., not capable of being shared), it is possible to define a reallocation group "A" which contains partitions (#2, #3, #4 and #5). In this instance, the processor reallocation is restricted only to those partitions within the defined reallocation group "A", namely between partitions #2, #3, #4 and #5. It is contemplated that multiple reallocation groups within the computer system may be defined, wherein any processing resource allocation is performed only within the defined reallocation groups. For instance, assuming reallocation group "A" contains partitions #2 and #3, and reallocation group "B" contains partitions #4 and #5, then processing resource allocation is restricted to occur only between partitions #2 and #3 (i.e., within group "A"), and between partitions #4 and #5 (i.e., within group "B"), respectively. If no reallocation groups are specifically defined, all partitions are included, by default, in a single reallocation group (as described earlier in FIGS. 2 and 3)

While the present invention has been illustrated by a description of various embodiments and while there embodiments have been described in considerable detail, it is not the intention of the applicants to restrict or in any way limit the scope of the appended claims to such detail. For example, while the present invention has been described in the context of various computing environments, those skilled in the art will appreciate that the mechanisms of the present invention are capable of being distributed as a program product in a variety of forms, such as a program for a computing system such as an IBM's iSeries server running OS/400 or another operating system, and that the present invention applies equally regardless of the particular type of signal bearing media to actually carry out the distribution. Examples of signal bearing media include: recordable type media such as floppy disks (e.g., a floppy disk) and CD ROMS, and transmission type media such as digital and analog communication links, including wireless communication links.

The invention in its broader aspects is therefore not limited to the specific details, representative apparatus and method, and illustrative examples shown and described. Accordingly, departures may be made from such details without departing from the spirit or scope of applicants' general inventive concept. It is intended that the scope of the present invention be limited not by this detailed description, but rather by the claims appended hereto. Therefore, the invention lies in the claims hereinafter appended.

What is claimed is:

1. An apparatus comprising:
   at least one processor;
   a memory coupled to the at least one processor;
   two or more logical partitions defined on the apparatus, wherein each of the two or more logical partitions owns portions of a shared processing resource; and
   a dynamic processor allocation mechanism residing in the memory and executed by the at least one processor, wherein the dynamic processor allocation mechanism reallocates the shared processing resource among the two or more logical partitions and wherein the amount of shared processing resource eligible to be reallocated is calculated on-the-fly by the dynamic processor allocation mechanism prior to the reallocation, the calculation comprising the steps of:

determining a current utilization of the shared processing resource for each of the two or more logical partitions;

determining a current utilization of the shared processing resource for the apparatus as a whole;

constructing, for each of the two or more logical partitions, a bid determined by dividing the current utilization of the partition by the utilization of the apparatus as a whole, wherein any partition having a bid less than 1 is classified as potential donating partition, and any partition having a bid greater than 1 is classified as a potential recipient partition;

calculating, for each potential recipient partition, an amount of resource desired to be received by multiplying the bid by a number of processing units currently assigned to the potential recipient partition, then subtracting the number of processing units currently assigned to the potential recipient partition; and calculating, for each potential donating partition, an amount of resource available for donation by subtracting the bid from 1, then multiplying the result by the number of processing units currently assigned to the potential donating partition.

2. The apparatus of claim 1, wherein the execution of the calculation occurs on a periodic, predetermined time interval.

3. The apparatus of claim 1, wherein a time interval between successive executions of the function is dynamically adjusted.

4. The apparatus of claim 1, wherein the shared processing resource comprises the at least one processor.

5. The apparatus of claim 1, wherein a reallocation group is defined to include at least two of the two or more logical partitions, wherein the dynamic processor allocation mechanism is restricted to operate only on logical partitions defined to exist within the allocation group.

6. The apparatus of claim 5, wherein multiple reallocation groups exist within the apparatus.

7. The apparatus of claim 1 wherein the potential donating partition having the lowest bid is the first partition to donate its resource during the reallocation.

8. The apparatus of claim 1 wherein the potential recipient partition having the highest bid is the first partition to receive resource during the reallocation.

9. The apparatus of claim 1, wherein the potential recipient partition becomes eligible to receive additional processing resource when its current resource utilization is greater than the current resource utilization for the apparatus as a whole plus a predefined variance.

10. The apparatus of claim 1, wherein the potential donating partition becomes eligible to donate excess processing resource when its current resource utilization is less than the current resource utilization for the apparatus as a whole minus a predefined variance.

11. A computer-implemented method for managing a shared processing resource in a computer system that includes two or more logical partitions that each own portions of the shared processing resource, the method comprising the steps of:

determining a current utilization of the shared processing resource for each of the two or more logical partitions and a current utilization of the shared processing resource for the computer system as a whole;

constructing, for each of the two or more logical partitions, a bid determined by dividing the current utilization of the partition by the utilization of the apparatus as a whole, wherein any partition having a bid less than 1 is classified as potential donating partition, and any partition having a bid greater than 1 is classified as a potential recipient partition;

calculating, for each potential recipient partition, an amount of resource desired to be received by multiplying the bid by a number of processing units currently assigned to the potential recipient partition, then subtracting the number of processing units currently assigned to the potential recipient partition; and calculating, for each potential donating partition, an amount of resource available for donation by subtracting the bid from 1, then multiplying the result by the number of processing units currently assigned to the potential donating partition; and reallocating the shared processing resource among the two or more logical partitions by reassigning at least some of the amount of resource available for donation from the potential donating partitions to the potential recipient partitions.

12. The method of claim 11, wherein the shared processing resource comprises the at least one processor.

13. A program product comprising:

a dynamic processor allocation mechanism which reallocates a shared processing resource among two or more logical partitions in a computer system, wherein the amount of shared processing resource eligible to be reallocated is calculated on-the-fly by the dynamic processor allocation mechanism prior to the reallocation, the calculation comprising the steps of:

determining a current utilization of the shared processing resource for each of the two or more logical partitions;

determining a current utilization of the shared processing resource for the apparatus as a whole;

constructing, for each of the two or more logical partitions, a bid determined by dividing the current utilization of the partition by the utilization of the apparatus as a whole, wherein any partition having a bid less than 1 is classified as potential donating partition, and any partition having a bid greater than 1 is classified as a potential recipient partition;

calculating, for each potential recipient partition, an amount of resource desired to be received by multiplying the bid by a number of processing units currently assigned to the potential recipient partition, then subtracting the number of processing units currently assigned to the potential recipient partition; and calculating, for each potential donating partition, an amount of resource available for donation by subtracting the bid from 1, then multiplying the result by the number of processing units currently assigned to the potential donating partition; and computer readable signal bearing recordable media bearing the dynamic processor allocation mechanism.

14. The program product of claim 13, wherein the shared processing resource comprises at least one processor.

* * * * *